Nov. 15, 1960  S. A. McGAVERN, JR., ET AL  2,960,333
TELESCOPING FLUID CYLINDER
Filed Dec. 28, 1956
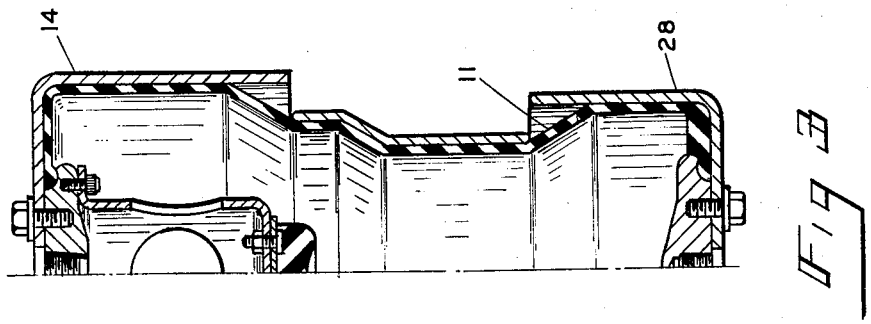
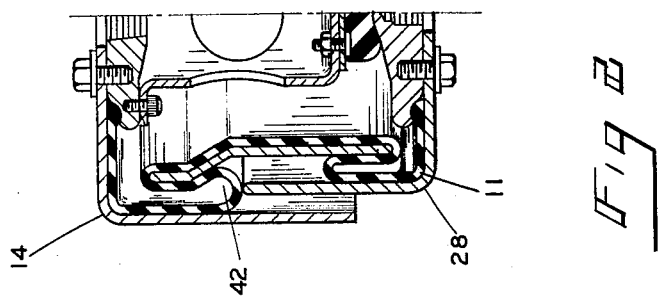
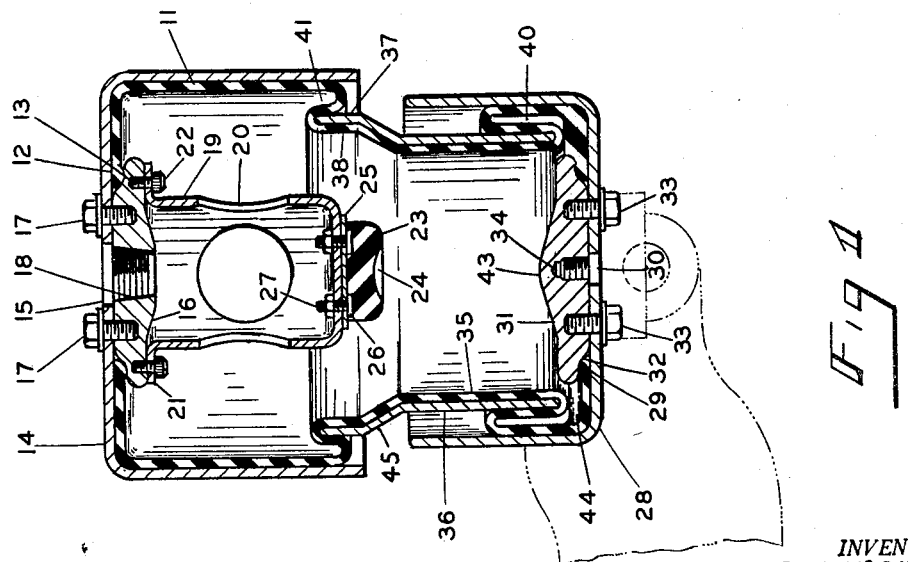
INVENTORS
SANFORD A. McGAVERN JR
BRUCE W. CAMPBELL
BY
Reuben Wolk
ATTORNEY

United States Patent Office 2,960,333
Patented Nov. 15, 1960

2,960,333

TELESCOPING FLUID CYLINDER

Sanford A. McGavern, Jr., and Bruce W. Campbell, Three Rivers, Mich., assignors to Dayco Corporation, a corporation of Ohio Filed Dec. 28, 1956, Ser. No. 631,300

5 Claims. (Cl. 267—65)

This invention relates to fluid cylinders and more particularly to a self-stabilizing air cylinder providing an air spring unit of an improved type. The air cylinder unit in accordance with the invention employs a telescoping rolling diaphragm resulting in improved operation.

In the development of the prior art, fluid cylinders such as air springs have generally employed conventional bellows-type diaphragms. The unit shock absorbing and suspension capabilities of these springs have proved to be of a limited nature and accordingly they leave much to be desired. These prior art fluid cylinders have indicated a tendency to rapidly lose their efficiency when subjected to other than normal load conditions. In efforts to meet the ever-increasing need for a more durable and efficient fluid or air cylinder unit we have found that the solution appears to be in a cylinder unit that employs a telescoping rolling diaphragm. In our co-pending application for Letters Patent Serial No. 577,778, filed April 12, 1956, and entitled, "Extensible Diaphragm Fluid Cylinder," we proposed a cylinder unit of an improved nature employing an extensible diaphragm. The present invention provides an improvement and modification of the fluid cylinder unit disclosed therein particularly relating to air spring suspension systems for vehicles.

The subject invention was developed as a result of efforts to increase the stability and the effective life and efficiency of fluid cylinder units as well as to increase their range of reliable application. In accordance with the invention, this is accomplished by an improved adaptation of a telescoping rolling diaphragm as will be described herein. This telescoping rolling diaphragm, in the preferred embodiment of this invention, effectively serves as a balancing and stabilizing load accommodating element in the fluid cylinder provided under a full range of load conditions. This utilization of the diaphragm offers an air cylinder unit of a most compact nature wherein the diaphragm serves to compensate for load variations as applied to the cylinder. As another primary feature, the invention further incorporates improved bumper or limit structure internally thereof which stabilizes the cylinder unit under maximum load conditions in particular.

An object of the invention is to provide an improved fluid cylinder unit.

A further object of the invention is to provide an improved air cylinder unit employing a telescoping rolling diaphragm in an improved manner.

Another object of the invention is to provide an improved air spring unit having a highly compact structure.

An additional object of the invention is to provide a fluid spring unit employing a telescoping rolling diaphragm which has a relatively short bottoming stroke and a long expansion stroke to the unit to accommodate load variations thereby with maximum efficiency and minimum wear.

A further object of the invention is to provide an improved floating suspension system incorporating internal stabilizing means effective particularly under maximum load conditions.

Another object of the invention is to provide an improved fluid cylinder unit incorporating a telescoping rolling diaphragm as a basic normal load support element therein and including improved stabilizing means effective under maximum load conditions.

An additional object of the invention is to provide an improved air spring unit possessing the advantageous structural features, the inherent meritorious characteristics, and the mode of operation herein described.

With these and other objects in view, as will more fully appear in the specification, the invention involved consists of the features of construction, the parts and combinations thereof, and the mode of operation as hereinafter described or illustrated in the accompanying drawings, or their equivalents.

Referring to the drawings wherein is found the preferred but obviously not necessarily the only form of the embodiment of the invention, Figure 1 is a vertical cross-sectional view of a fluid cylinder unit including an air spring unit in accordance with the preferred embodiment of the invention.

Figure 2 is a sectional view similar to Figure 1, illustrating the device of Figure 1 in an absolute bottomed or jounced position under maximum load conditions; and Figure 3 is a sectional view of the same unit in fully extended or rebound position.

The invention can be best described with reference to the accompanying drawings. As shown in Figure 1 of the drawings, the preferred embodiment of the fluid cylinder or air spring unit of the invention employs a generally tubular telescoping rolling diaphragm 11 preferably of natural or artificial rubber or other material of a highly resilient nature. This diaphragm is formed to have a critically varying diameter at selected portions thereof. The diaphragm 11 has an integral circumferential bead 12 internally thereof at its upper extremity. About the upper portion of the diaphragm 11 is a mounting or load receiving container or cup 14 having a central aperture 15 therein. This cup 14 is preferably fabricated of a high strength metal. The respective ends of the diaphragm 11 are formed to have reduced circumference and in this instance the upper end thereof is so formed to be disposed within the cup 14 to line the inner surface thereof and to dispose the bead 12 and adjacent portions in adhesively contacting relation to the overlying base of the cup 14 with the bead 12 in radially spaced relation to and about the aperture 15 therein. A clamping plate 16 having a disc-like configuration sealingly seats to the inner surface of the base of the cup 14 within the bead 12 defining the opening at the upper end of the diaphragm. This plate 16 has a peripheral projection providing a circular recess 13 therein which receives and accommodates the bead 12 as the plate seats to the cup member. Threaded bolts 17 extend through the cup 14 and engage the plate 16 to clamp it to the cup member and thereby seal the bead 12 of the diaphragm to the internal surface of the cup. The clamping plate 16, which thereby covers the opening in the upper end of the diaphragm, has a threaded aperture 18 centrally thereof which is aligned with the aperture 15 in the cup 14. Suitable connection may be made in the threaded aperture 18 in the clamping plate 16 for introduction of fluid or air pressure within the diaphragm 11 as required, after which the aperture is sealed by means of a threaded plug which is placed therein.

A cup 19 having lightening holes 20 therein has an external flange 21 at the upper open end thereof which abuts the clamping plate 16 adjacent the periphery thereof and is connected thereto by screws 22. At the bottom of this cup 19, mounted on plate 16, is fixed a bumper 23 constructed of resilient material such as rubber, which has a central concave recess 24 in its lower surface. A thin metal plate 25 serves as a backing for the bumper 23 and is interposed between the lower surface of the cup and the bumper. The connection of the bumper 23 to the cup 19 is by means of threaded studs 26 integrally connected in the bumper 23 and projecting through apertures in the plate 25 and the cup 19. Nuts 27 engaging studs 26 serve to clamp the bumper 23 centrally to the cup.

The lower portion of the diaphragm 11 is enclosed within a cup 28 having a configuration similar to the cup 14 but of reduced dimension. The elements 14 and 28 are aligned and disposed to open towards each other. The internal diameter of the cup 28 is less than that of the cup 14 and the configuration of the lower end of the diaphragm conforms thereto. An integral internal bead 29 is provided at the lower extremity of the diaphragm 11 and defines a reduced diameter of the diaphragm as does bead 12. This portion of the diaphragm adjacent bead 29 is formed to seat in the internal surface of the cup 28. This disposes bead 29 concentrically to an aperture 30 located centrally of the cup base. A plate 31 seats on the internal base surface of the cup 28 in sealing centrally contacting relation thereto. This plate 31 also has a peripheral portion including a recess 32 opposed to the internal surface of the cup so that as the plate is clamped to the cup by bolts 33, the bead 29 is received in this peripheral recess in the plate and is sealingly clamped to the cup thereby. In this manner the respective ends of the diaphragm 11 are sealed. A threaded recess 34 is provided in the center of plate 31 in alignment with the aperture in the cup 28.

The tubular diaphragm 11 has a section 35 of minimum diameter intermediate the extremities thereof which on full extension of the diaphragm lies between the cups 14 and 28. A substantially cylindrical metal cylinder 36 is mounted on and fully supported by the section 35 of the diaphragm and causes that portion of the diaphragm to conform thereto. The upper end 37 of the cylinder 36 has a radial offset 45 which provides a slightly expanded diameter. The contained section 35 of the diaphragm is similarly offset at 38 to permit connection thereof in smooth relation to the internal surface of the cylinder.

The cylinder unit thus provided has a nested or telescoped configuration under normal load conditions as shown in Figure 1 of the drawings, the load being applied to the upper surface of the cup 14 with the lower cup 28 mounted to a support axle or the like, depending on the structure to which the unit is applied.

The configration of the diaphragm is such as shown therein that under normal load the contained section 35 of the diaphragm with its metal containing cylinder 36 telescopically and substantially nests in the lower cup 28. The lower end of the cylinder 36 rests upon a plurality of ribs 44 which are formed in the lower portion of the diaphragm which rests upon the lower surface of the cup 28. The lower section of the diaphragm is thus telescoped to form a pocket 40 in containing supporting relation to the cylinder 36. The diaphragm 11 is slightly telescoped about the upper expanded end 37 of the cylinder 36 forming an annular pocket 41 thereabout. In this fashion, on introduction of the required amount of air or fluid in the diaphragm 11, the annular pocket of air 41 about the upper expanded end of the cylinder 36 serves to balance the contained portion of the diaphragm and stabilize it in floating condition within the cup elements. The deep seated nesting of the contained portion of the diaphragm provides a highly balanced floating condition thereof with considerable shock cushioning afforded thereto. At the same time, the lower annular pocket 40 positions the assembly in a radial direction to maintain the positioning with respect to the center line. The existence of the ribs 44 will cause a positive pressure to be exerted in pocket 40 at all times, by preventing the lower telescoped portion of the diaphragm from sealing along the bottom, and thus maintaining an opening into the main body of the diaphragm. The radial offset 45 introduces a component of force in a downward direction which tends to keep the cylinder 36 resting on the ribs 44 during normal operation.

Upon application of maximum or shock loads, as shown in Figure 2, there is a minimum of vertical travel of the contained portion of the diaphragm and the deep seated normal positioning thereof maintains a laterally stabilized and cushioned condition. The load accommodating cup will telescope the upper portion of the diaphragm about and under the radially expanded portion 37 of the container 36 to provide a substantial increase in the lateral and vertical cushioning available for the container. Since an expanding pocket of air 42 is provided by the diaphragm as it adheres to the sides of the container 36 as it rolls downwardly and under the section 37 of the container, it offers increased vertical cushioning and shock absorbing effect in response to the load. The plate 31 has a convex central portion 43 which mates with the central portion of bumper 23. In the event that severe load or shock occurs, this portion 43 will tend to mate with concave recess 24 in the flexible resilient disc 23 in the cup 19. The result of this is to provide a further internal stabilizing of the spring unit to maintain its desired vertical disposition and prevent damage and undue wear thereto. At the same time, the pocket 40 is maintained at the same positive pressure due to the maintenance of spacings of the bottom of the diaphragm by the ribs 44.

Figure 3 illustrates a spring unit in the rebound position. As seen therein, the contained portion of the diaphragm maintains its relation to the cups 14 and 28 due to its configuration. Since the diaphragm is in continuously cupping relation to the cylinder 36, it affords resistance to lateral deviation of the contained portion of the diaphragm. Also the radially expanded upper portion of the cylinder 36 provides a self-balancing configuration. During this position the pockets 40 and 41 both disappear due to the elongation of the diaphragm.

It may be thus seen that the cylinder unit of the present invention provides a normal maximum compactness in the simplest of construction. The shock absorbing strokes are of a minimum character under maximum load and shock effects, thus reducing wear and tear on the unit to a minimum. The nature of the modified configuration of the diaphragm and the central containing element therefor provides maximum stability and shock absorbing characteristics beyond that contemplated in the prior art. The net effect of these improved cylinder units is a suspension system wherein the load may be supported closer to the ground under normal conditions to afford substantial stability with corresponding increase in resistance to lateral shock effects.

From the above description it will be readily apparent that there is thus provided a device of the character described possessing the particular features but which is capable of modification in its form, proportions, detail construction and arrangement of parts without departing from the principles involved or sacrificing any of its advantages.

In order to comply with this statute, the invention has been described in language more or less specific as to structural features, but it is to be understood that the invention is not limited to the specific features shown. The means and construction herein disclosed comprise the preferred form of several modes of putting the invention into effect and the invention is therefore claimed in any of its forms or modifications within the legitimate and valid scope of the appended claims.

Having thus described our invention, we claim:

1. In a vehicle fluid suspension system, a fluid cylinder comprising a flexible, generally tubular diaphragm, means mounted on and closing one end of said diaphragm providing a rigid base therefor and having a bumper connected thereto extending internally of said diaphragm, means mounted on and closing the other end of said diaphragm having a second bumper extending internally of said diaphragm, means fully supported by and radially restricting said diaphragm intermediate the ends thereof and seating in telescoped relation to said first means under normal load conditions to provide a cylinder of stabilizing air for resisting lateral and vertical load effects, one end of said diaphragm being telescoped within one of said mounting means defining a lateral stabilizing pocket of air.

2. In a vehicle fluid suspension system, an air spring unit comprising a flexible tubular diaphragm radially restricted intermediate the ends, cup members enclosing the extremities of said diaphragm, means connecting said cup members to the ends of said diaphragm including mating shock absorbing elements thereon extending internally of the diaphragm, the restricted portion of said diaphragm being normally telescoped within one of said mounting means to define a stabilizing pocket of air, said mating shock absorbing elements having concave and convex mating surfaces and meeting at maximum load to prevent complete bottoming and further stabilize the unit.

3. In a vehicle fluid suspension system, an air spring unit comprising a rolling tubular diaphragm of generally cylindrical configuration throughout its length and formed with internal beaded portions at its extremities, cup members mounted in and containing the extremities of said diaphragm, shaped plate elements adjustably connected to the interior of said cup members to engage said beaded portions in sealing relation to the internal surface of said cup members and providing a chamber for containing air under predetermined pressure, a cylindrical sleeve mounted on, conforming to, and containing intermediate portions of said diaphragm and in substantially completely nesting relation to the diaphragm at one end during normal load conditions, said plate elements including projecting limit means to prevent complete bottoming of the spring unit upon application of maximum load.

4. In a vehicle fluid suspension system, an air spring unit comprising a rolling tubular diaphragm of generally cylindrical configuration throughout its length and formed with internal beaded portions at its extremities, cup members mounted in and containing the extremities of said diaphragm, shaped plate elements adjustably connected to the interior of said cup members to engage said beaded portions in sealing relation to the internal surface of said cup members and providing a chamber for containing air under predetermined pressure, said plate elements including projecting limit means to prevent complete bottoming of the spring unit upon application of maximum load, a cylindrical sleeve fully supported by and containing intermediate portions of said diaphragm, said sleeve and that portion of said diaphragm on which it is mounted having a radial offset, one end of said diaphragm being telescoped within one of said mounting cups to define a radial stabilizing pocket of air.

5. In a vehicle fluid suspension system, an air spring unit comprising a rolling tubular diaphragm of generally cylindrical configuration throughout its length and formed with internal beaded portions at its extremities, cup members mounted in and containing the extremities of said diaphragm, the upper portion of said diaphragm in contact with substantially the entire inner surface of its corresponding mounting cup member, shaped plate elements adjustably connected to the interior of said cup members to engage said beaded portions in sealing relation to the internal surface of said cup members and providing a chamber for containing air under predetermined pressure, said plate elements including projecting limit means to prevent complete bottoming of the spring unit upon application of maximum load, a cylindrical sleeve fully supported by and containing intermediate portions of said diaphragm, said sleeve and that portion of said diaphragm on which it is mounted having a radial offset, one end of said diaphragm being telescoped within one of said mounting cups to define a radial stabilizing pocket of air.

References Cited in the file of this patent

UNITED STATES PATENTS

| | | |
|---|---|---|
| 894,117 | Clark | July 21, 1908 |
| 2,133,279 | Brown | Oct. 18, 1938 |
| 2,391,120 | Berthelmann | Dec. 18, 1945 |
| 2,578,730 | Nicholson et al. | Dec. 18, 1951 |
| 2,624,594 | Gouirand | Jan. 6, 1953 |
| 2,633,155 | Wallerstein | Mar. 31, 1953 |